(12) United States Patent
Vartak et al.

(10) Patent No.: US 11,599,072 B2
(45) Date of Patent: *Mar. 7, 2023

(54) APPARATUS AND METHOD FOR IDENTIFYING, VISUALIZING, AND TRIGGERING WORKFLOWS FROM AUTO-SUGGESTED ACTIONS TO RECLAIM LOST BENEFITS OF MODEL-BASED INDUSTRIAL PROCESS CONTROLLERS

(71) Applicant: Honeywell International Inc., Morris Plains, NJ (US)

(72) Inventors: Mandar Vartak, Bangalore (IN); Andrew Trenchard, Romsey (GB); Matthew G. Grizzle, Phoenix, AZ (US); Christopher J. Webb, Scottsdale, AZ (US); Sanjay K. Dave, Bangalore (IN); Sriram Hallihole, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 233 days.

This patent is subject to a terminal disclaimer.

(21) Appl. No.: 16/888,633

(22) Filed: May 29, 2020

(65) Prior Publication Data

US 2020/0293007 A1   Sep. 17, 2020

Related U.S. Application Data

(63) Continuation of application No. 15/972,535, filed on May 7, 2018, now Pat. No. 10,678,195.

(Continued)

(51) Int. Cl.
  *G05B 13/04* (2006.01)
  *G05B 19/4063* (2006.01)
  (Continued)

(52) U.S. Cl.
  CPC ......... *G05B 13/041* (2013.01); *G05B 19/406* (2013.01); *G05B 19/4063* (2013.01);
  (Continued)

(58) Field of Classification Search
  CPC .............. G05B 13/041; G05B 19/4063; G05B 19/41885; G05B 2219/23292; G05B 2219/31359; Y02P 90/02
  See application file for complete search history.

(56) References Cited

U.S. PATENT DOCUMENTS 5,351,184 A   9/1994 Lu et al.
5,602,761 A   2/1997 Spoerre et al.
(Continued)

FOREIGN PATENT DOCUMENTS

EP   1420153 A2 *   5/2004   ................ F02C 9/00
EP   2045673 A2   4/2009
(Continued)

OTHER PUBLICATIONS

International Search Report and Written Opinion of the International Searching Authority regarding International Application No. PCT/US2016/031595 dated Aug. 18, 2016, 15 pages.
(Continued)

*Primary Examiner* — Vincent H Tran
(74) *Attorney, Agent, or Firm* — Seager, Tufte & Wickhem, LLP (57) ABSTRACT

A method includes obtaining data associated with operation of an industrial process controller and identifying impacts of operational problems of the industrial process controller. The method also includes generating a graphical display for a user, where the graphical display presents one or more recommended actions to reduce or eliminate at least one of the impacts of at least one of the operational problems. The method further includes triggering at least one of the one or
(Continued)

more recommended actions based on input from the user. The method could also include executing one or more analytic algorithms to process the obtained data and identify the operational problems of the industrial process controller. Each of the one or more analytic algorithms could be instantiated as a container, and multiple containers could be instantiated and executed as needed. Results of executing the one or more analytic algorithms could be transformed into a standard format.

20 Claims, 5 Drawing Sheets

Related U.S. Application Data (60) Provisional application No. 62/518,352, filed on Jun. 12, 2017, provisional application No. 62/518,397, filed on Jun. 12, 2017, provisional application No. 62/518,474, filed on Jun. 12, 2017, provisional application No. 62/518,478, filed on Jun. 12, 2017.

(51) Int. Cl.
  *G05B 19/418* (2006.01)
  *G05B 19/406* (2006.01)
  *G05B 23/02* (2006.01)

(52) U.S. Cl.
  CPC . *G05B 19/41875* (2013.01); *G05B 19/41885* (2013.01); *G05B 23/0272* (2013.01); *G05B 2219/23292* (2013.01); *G05B 2219/31359* (2013.01); *G05B 2219/37001* (2013.01)

(56) References Cited

U.S. PATENT DOCUMENTS

| | | | |
|---|---|---|---|
| 6,385,496 B1 | 5/2002 | Irwin et al. | |
| 6,535,769 B1 | 3/2003 | Konar | |
| 6,577,323 B1 | 6/2003 | Jamieson et al. | |
| 6,666,049 B1 | 12/2003 | Katende et al. | |
| 6,901,560 B1 | 5/2005 | Guerlain et al. | |
| 7,127,304 B1* | 10/2006 | Gould | G05B 13/024 |
| | | | 700/20 |
| 7,421,374 B2 | 9/2008 | Zhan et al. | |
| 8,108,790 B2 | 1/2012 | Morrison, Jr. et al. | |
| 8,185,217 B2 | 5/2012 | Thiele | |
| 9,715,221 B2 | 7/2017 | Zheng et al. | |
| 9,846,107 B1 | 12/2017 | D'Amico et al. | |
| 10,345,796 B2 | 7/2019 | Naito | |
| 10,761,496 B2 | 9/2020 | Trenchard et al. | |
| 2004/0049299 A1 | 3/2004 | Wojsznis et al. | |
| 2005/0075738 A1 | 4/2005 | Attarwala | |
| 2005/0137721 A1 | 6/2005 | Attarwala | |
| 2005/0149208 A1 | 7/2005 | Harmse et al. | |
| 2005/0171626 A1 | 8/2005 | Schwarm | |
| 2007/0142936 A1 | 6/2007 | Denison et al. | |
| 2007/0225835 A1 | 9/2007 | Zhu | |
| 2007/0268122 A1 | 11/2007 | Kow et al. | |
| 2007/0276512 A1 | 11/2007 | Fan et al. | |
| 2008/0065242 A1 | 3/2008 | Attarwala | |
| 2008/0109100 A1* | 5/2008 | Macharia | C12M 41/48 |
| | | | 700/110 |
| 2008/0140227 A1 | 6/2008 | Attarwala | |
| 2008/0243289 A1* | 10/2008 | Yelchuru | G05B 17/02 |
| | | | 700/109 |
| 2008/0244449 A1 | 10/2008 | Morrison et al. | |
| 2009/0043546 A1 | 2/2009 | Srinivasan et al. | |
| 2009/0112335 A1* | 4/2009 | Mehta | G05B 23/0243 |
| | | | 700/29 |
| 2009/0204245 A1 | 8/2009 | Sustaeta et al. | |
| 2009/0287319 A1 | 11/2009 | Attarwala | |
| 2009/0300430 A1 | 12/2009 | Nissan-Messing et al. | |
| 2009/0319059 A1 | 12/2009 | Renfro et al. | |
| 2010/0030521 A1* | 2/2010 | Akhrarov | G05B 23/0229 |
| | | | 702/182 |
| 2010/0038286 A1 | 2/2010 | Greaney et al. | |
| 2010/0076809 A1 | 3/2010 | Eryurek et al. | |
| 2010/0082125 A1 | 4/2010 | Pingel et al. | |
| 2010/0082273 A1 | 4/2010 | Lakomiak et al. | |
| 2010/0082396 A1 | 4/2010 | Caldwell et al. | |
| 2010/0083029 A1 | 4/2010 | Erickson et al. | |
| 2010/0114810 A1 | 5/2010 | Hoyte et al. | |
| 2010/0156654 A1 | 6/2010 | Bullemer et al. | |
| 2010/0188410 A1 | 7/2010 | Gilbert et al. | |
| 2010/0218030 A1 | 8/2010 | Bhatnagar et al. | |
| 2010/0241247 A1 | 9/2010 | Attarwala | |
| 2010/0318934 A1 | 12/2010 | Blevins et al. | |
| 2011/0091321 A1 | 4/2011 | Baker et al. | |
| 2011/0130850 A1 | 6/2011 | Zheng et al. | |
| 2011/0258568 A1 | 10/2011 | Pandurangan et al. | |
| 2012/0083917 A1 | 4/2012 | Zhou et al. | |
| 2012/0180133 A1 | 7/2012 | Al-Harbi et al. | |
| 2012/0253875 A1 | 10/2012 | Harsh et al. | |
| 2012/0290104 A1 | 11/2012 | Holt et al. | |
| 2013/0317629 A1 | 11/2013 | Shapiro et al. | |
| 2014/0222378 A1 | 8/2014 | Piety et al. | |
| 2014/0330402 A1 | 11/2014 | Keenan et al. | |
| 2014/0344007 A1 | 11/2014 | Shende et al. | |
| 2015/0134647 A1 | 5/2015 | Sayyarrodsari et al. | |
| 2015/0148919 A1* | 5/2015 | Watson | G05B 23/0297 |
| | | | 700/31 |
| 2015/0371418 A1 | 12/2015 | Laycock et al. | |
| 2016/0180220 A1* | 6/2016 | Boettcher | G05B 19/042 |
| | | | 700/276 |
| 2016/0180240 A1 | 6/2016 | Majumdar et al. | |
| 2016/0182309 A1* | 6/2016 | Maturana | G06F 30/20 |
| | | | 709/224 |
| 2016/0234242 A1 | 8/2016 | Knapp et al. | |
| 2016/0258363 A1* | 9/2016 | Tiwari | F02C 9/42 |
| 2016/0274552 A1* | 9/2016 | Strohmenger | G06Q 10/06 |
| 2016/0349740 A1 | 12/2016 | Niemiec et al. | |
| 2017/0212507 A1 | 7/2017 | Naito | |
| 2017/0357240 A1 | 12/2017 | Stewart et al. | |
| 2017/0364043 A1* | 12/2017 | Ganti | G05B 17/02 |
| 2018/0017959 A1 | 1/2018 | Pandian et al. | |
| 2018/0032940 A1 | 2/2018 | Trenchard et al. | |
| 2018/0039956 A1 | 2/2018 | McElhinney et al. | |
| 2018/0081349 A1* | 3/2018 | Lu | G05B 17/02 |
| 2018/0356806 A1 | 12/2018 | Dave et al. | |
| 2018/0356811 A1 | 12/2018 | Trenchard et al. | |
| 2019/0079472 A1 | 3/2019 | Hou et al. | |
| 2022/0129173 A1* | 4/2022 | Martin | G06F 3/067 |

FOREIGN PATENT DOCUMENTS

| | | | |
|---|---|---|---|
| WO | 0020939 A1 | 4/2000 | |
| WO | 2004070569 A2 | 8/2004 | |
| WO | 2007067645 A2 | 6/2007 | |
| WO | 2009120362 A2 | 10/2009 | |
| WO | WO-2010088693 A1 * | 8/2010 | G05B 13/048 |
| WO | 2013087973 A1 | 6/2013 | |

OTHER PUBLICATIONS

Martin et al; "Estimating control function benefits," Hydrocarbon Processing 69, pp. 68-73, 1991.
Webb et al; "Using Advanced Control to Monitor Unit Performance and Economics," American Institute of Chenical Engineers, 2018 Spring Meeting and 14th Global Congress on Process Safety, 21 pages, Apr. 2018.
European Extended Search Report, EP Application No. 18817244.9, dated Jan. 29, 2021 (9 pgs).

* cited by examiner

APPARATUS AND METHOD FOR IDENTIFYING, VISUALIZING, AND TRIGGERING WORKFLOWS FROM AUTO-SUGGESTED ACTIONS TO RECLAIM LOST BENEFITS OF MODEL-BASED INDUSTRIAL PROCESS CONTROLLERS

CROSS-REFERENCE TO RELATED APPLICATIONS AND PRIORITY CLAIM

This application is a continuation of U.S. application Ser. No. 15/972,535, filed May 7, 2018, which claims the benefit under 35 U.S.C. § 119(e) of the following U.S. provisional patent applications:

U.S. Provisional Patent Application No. 62/518,352 filed on Jun. 12, 2017;

U.S. Provisional Patent Application No. 62/518,397 filed on Jun. 12, 2017;

U.S. Provisional Patent Application No. 62/518,474 filed on Jun. 12, 2017; and

U.S. Provisional Patent Application No. 62/518,478 filed on Jun. 12, 2017. All of which are hereby incorporated by reference.

TECHNICAL FIELD

This disclosure relates generally to industrial process control and automation systems. More specifically, this disclosure relates to an apparatus and method for identifying, visualizing, and triggering workflows from auto-suggested actions to reclaim lost benefits of model-based industrial process controllers.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators.

Model-based industrial process controllers are one type of process controller routinely used to control the operations of industrial processes. Model-based process controllers typically use one or more models to mathematically represent how one or more properties within an industrial process respond to changes made to the industrial process. Unfortunately, the benefits that can be obtained using model-based controllers often decline over time. This can be due to a number of factors, such as inaccurate models, misconfiguration, or operator actions. In some extreme cases, the benefits that could be obtained using model-based controllers can be reduced by up to fifty percent or even more over time.

SUMMARY

This disclosure provides an apparatus and method for identifying, visualizing, and triggering workflows from auto-suggested actions to reclaim lost benefits of model-based industrial process controllers.

In a first embodiment, a method includes obtaining data associated with operation of an industrial process controller and identifying impacts of operational problems of the industrial process controller. The method also includes generating a graphical display for a user, where the graphical display presents one or more recommended actions to reduce or eliminate at least one of the impacts of at least one of the operational problems. The method further includes triggering at least one of the one or more recommended actions based on input from the user.

In a second embodiment, an apparatus includes at least one interface configured to receive data associated with operation of an industrial process controller. The apparatus also includes at least one processor configured to identify impacts of operational problems of the industrial process controller. The at least one processor is also configured to generate a graphical display for a user, where the graphical display presents one or more recommended actions to reduce or eliminate at least one of the impacts of at least one of the operational problems. The at least one processor is further configured to trigger at least one of the one or more recommended actions based on input from the user.

In a third embodiment, a non-transitory computer readable medium contains instructions that when executed cause at least one processing device to obtain data associated with operation of an industrial process controller and identify impacts of operational problems of the industrial process controller. The medium also contains instructions that when executed cause the at least one processing device to generate a graphical display for a user, where the graphical display presents one or more recommended actions to reduce or eliminate at least one of the impacts of at least one of the operational problems. The medium further contains instructions that when executed cause the at least one processing device to trigger at least one of the one or more recommended actions based on input from the user.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, model-based industrial process controllers are one type of process controller routinely used to control the operations of industrial processes. Model-based process controllers can help to improve the performance of continuous or other industrial processes. For example, in industrial processes, a controlled variable (CV) generally represents a process variable that can be measured or inferred and that is ideally controlled to be at or near a desired setpoint or within a desired range of values. A manipulated variable (MV) generally represents a process variable that can be adjusted in order to alter one or more controlled variables. A disturbance variable (DV) generally represents a process variable whose value can be considered but cannot be controlled. As a simple example, a flow rate of material through a pipe could denote a controlled variable, a valve opening for a valve that controls the flow rate of material could denote a manipulated variable, and an ambient temperature around the pipe or the valve could denote a disturbance variable.

Model-based control techniques are used in various process industries, such as to drive complex systems that are interactive with transport delays to operate at their limits while delivering operational performance and economic benefits to their owners or operators. Unfortunately, as noted above, the benefits of model-based controllers often decline over time due to various factors. One reason for this decline is that operations leaders (decision makers) responsible for managing performance may not understand the business or other impacts caused by instrumentation issues, operator behaviors, soft sensor performance, and model mismatch that can limit model-based controllers' performance. It can also be difficult to quantify the loss of model-based controller benefits, pinpoint root causes for the losses, and resolve the losses based on the identified causes. Further, organizations often have different model-based controller vendors and controller versions installed across their sites, and there is currently no way to provide a seamless mechanism that quantifies a loss of benefits that is vendor- and version-neutral. In addition, organizations often have engineering teams that monitor process performance, and these teams often need specific contextual visualizations for controller issue resolutions based on their scopes of responsibility and user roles.

This disclosure provides a framework that can be used to identify model-based controller issues, visualize the controller issues and their impacts along with auto-suggested actions, and trigger workflows and/or actions to resolve the controller issues across a plant or enterprise. In some embodiments, the impacts are expressed in terms of economic impacts, such as monetary losses. Of course, the impacts could be expressed in other ways, such as excess material usage, excess energy usage, or reduced product production. A "cost" of an impact can serve as a measure of the excess material usage, excess energy usage, reduced product production, economic loss, or other impact. Among other things, the framework can be used to increase the effectiveness of model-based controllers in driving units or other equipment to optimal operating targets, thereby reclaiming lost benefits.

The framework described in more detail below can be scalable and elastic, such as through the use of analytic containers that can be instantiated and executed as needed to process data and identify issues affecting model-based controllers. In some embodiments, a single instance of the framework could be deployed and used to analyze data associated with multiple model-based controllers, which can be located at a single industrial site or at multiple industrial sites. Multiple instances of the framework could also be deployed in and used with one or more industrial sites. Also or alternatively, one or more instances of the framework could be deployed "in the cloud" or at locations remote from one or more industrial sites.

In this way, the framework helps to identify different operational issues that can affect a model-based controller, the impacts of those operational issues, and possible remedies for those operational issues. The results of the analyses can then be used to modify the operation of the model-based controller or other components in order to reduce the impacts of the operational issues, which affects how the controller controls the underlying industrial process.

Among other things, this could enable a new Industrial Internet of Things (IIoT) service or other service to be deployed, where the service can be used to reduce the cost of troubleshooting a model-based controller's performance and to improve the lifecycle benefits of the model-based controller. In particular embodiments, these techniques could be implemented using a computer program that periodically analyses batches of data collected from customers' premises as part of a cloud-based analytics solution. The resulting analysis conclusions could then be visualized to the customers using cloud-hosted dashboards to enable the customers, support engineering teams, or other personnel to view performance information and troubleshoot performance issues.

Figure 1:
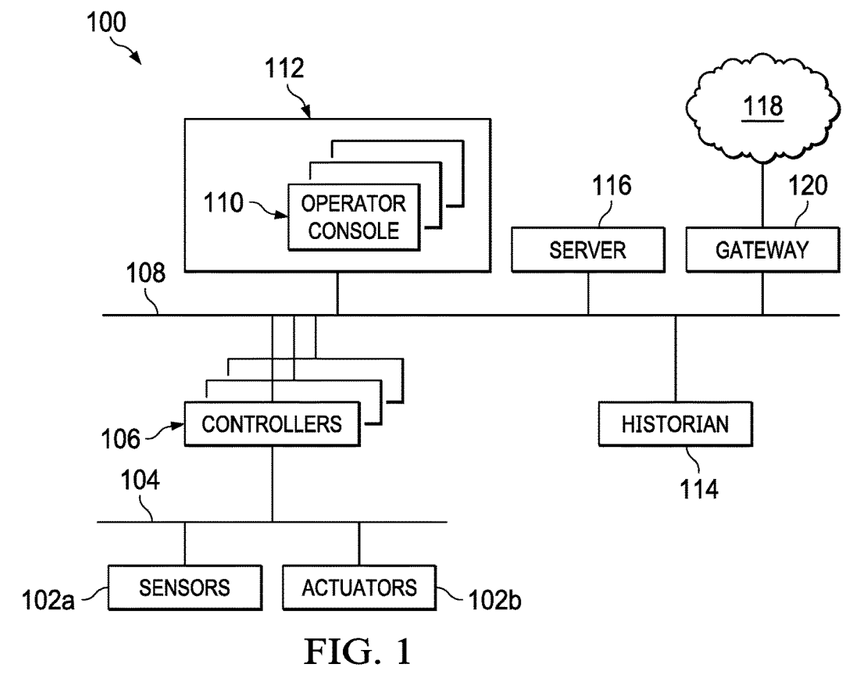
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one of the controllers 106 shown in FIG. 1 denotes a model-based controller that operates using one or more process models. For example, each of these controllers 106 could operate using one or more process models to determine, based on measurements from one or more sensors 102a, how to adjust one or more actuators 102b. In some embodiments, each model associates one or more manipulated or disturbance variables (often referred to as independent variables) with one or more controlled variables (often referred to as dependent variables). Each of these controllers 106 could use an objective function to identify how to adjust its manipulated variables in order to push its controlled variables to the most attractive set of constraints.

At least one network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here may optionally include at least one historian 114 and/or one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

At least one component of the system 100 could support a mechanism for identifying, visualizing, and triggering workflows from auto-suggested actions to reclaim lost benefits of model-based industrial process controllers. For example, this functionality could be implemented in an operator console 110, a server 116, or a computing cloud 118 or remote server. Among other things, this functionality can be used to evaluate data associated with one or more model-based controllers 106 to identify operational issues affecting the controller(s) 106, and the impacts of any identified operational issues and possible remedies for the identified operational issues can be determined. Visualizations can also be provided, such as on displays of the operator consoles 110, to help users identify the operational issues, their impacts, and possible resolutions. Ideally, this allows the operational issues to be prioritized and reduced or resolved, which can help to improve the operation of the model-based controllers 106. Additional details regarding this functionality are provided below.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs. As a particular example, the historian 114 may be implemented in the computing cloud 118. Further, particular functions have been described as being performed by particular components of the system 100. This is for illustration only. In general, control and automation systems are highly configurable and can be configured in any suitable manner according to particular needs. In addition, FIG. 1 illustrates one example operational environment where identifying, visualizing, and triggering workflows from auto-suggested actions to reclaim lost benefits of model-based industrial process controllers can be used. This functionality can be used in any other suitable system.

Figure 2:
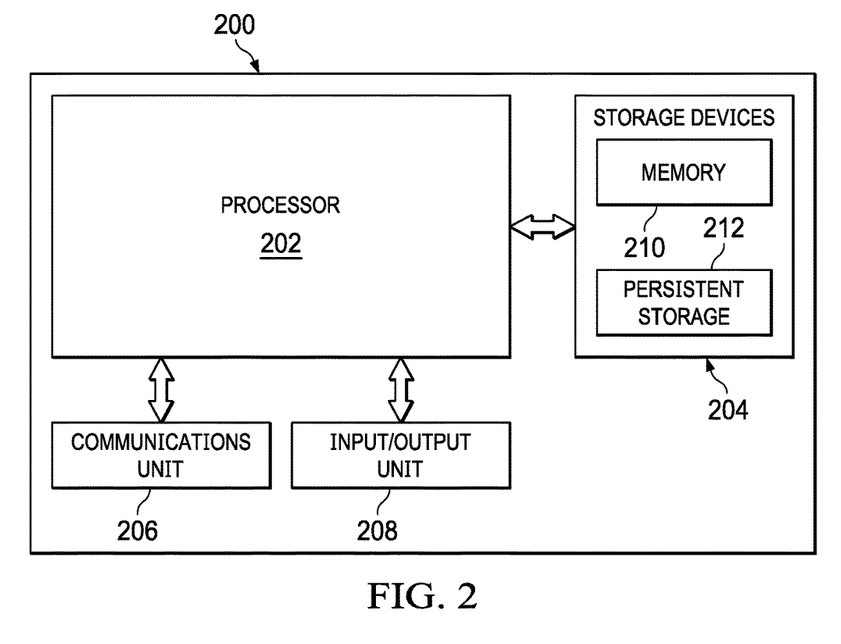
FIG. 2 illustrates an example device for identifying, visualizing, and triggering workflows from auto-suggested actions to reclaim lost benefits of model-based industrial process controllers according to this disclosure.

FIG. 2 illustrates an example device 200 for identifying, visualizing, and triggering workflows from auto-suggested actions to reclaim lost benefits of model-based industrial process controllers according to this disclosure. The device 200 could, for example, denote an operator console 110, server 116, or device used in the computing cloud 118 described above with respect to FIG. 1. However, the device 200 could be used in any other suitable system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could identify, visualize, and trigger workflows from auto-suggested actions to reclaim lost benefits of model-based industrial process controllers. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 for identifying, visualizing, and triggering workflows from auto-suggested actions to reclaim lost benefits of model-based industrial process controllers, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
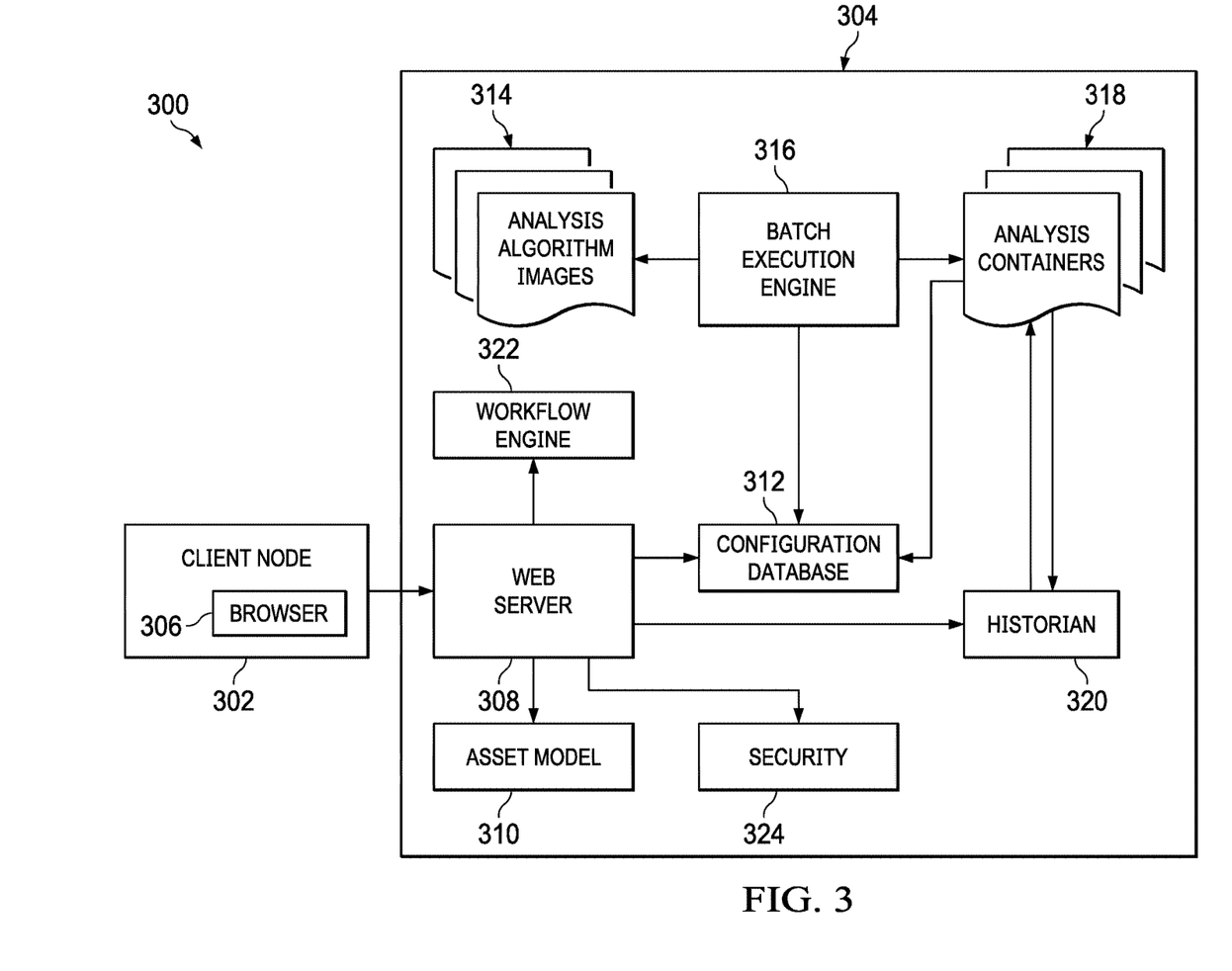
FIG. 3 illustrates an example framework for identifying, visualizing, and triggering workflows from auto-suggested actions to reclaim lost benefits of model-based industrial process controllers according to this disclosure.

FIG. 3 illustrates an example framework 300 for identifying, visualizing, and triggering workflows from auto-suggested actions to reclaim lost benefits of model-based industrial process controllers according to this disclosure. For ease of explanation, most of the framework 300 is described as being provided by the device 200 of FIG. 2 implementing an operator console 110, server 116, or device used in the computing cloud 118 of FIG. 1. However, the framework 300 could be used with any suitable device(s) and in any suitable system.

As shown in FIG. 3, the framework 300 is implemented using a client-server architecture that includes at least one client node 302 and at least one server node 304. Each client node 302 generally represents a computing device or other device used by a user to interact with a server node 304. Each server node 304 generally represents a computing device that executes applications or other logic for providing desired functionality. Each client node 302 includes any suitable device for interacting with a server or other computer, such as a desktop computer, laptop computer, tablet computer, or smartphone. Each server node 304 includes any suitable computing device for executing applications or other logic and could have the same general structure shown in FIG. 2.

In this example, each client node 302 includes or executes a web browser 306, which denotes an application or other logic that allows a user to interact with other devices (including the server node 304) using the Hypertext Transfer Protocol (HTTP) or other network-based protocol. Also, in this example, the server node 304 includes or executes a web server 308, which interacts with the web browser 306 in order to support communications between the nodes 302 and 304. The web server 308 generally represents an application or other logic that processes incoming HTTP or other requests from external devices and that serves data to external devices. Among other things, as described in more detail below, the web server 308 can receive data associated with operation of one or more model-based controllers 106 and provide the data for storage or analysis. The web server 308 can also provide requests for analysis of that data to other components of the server node 304 and provide results based on the analysis to at least one client node 302, such as in the form of one or more graphical displays.

The server node 304 also includes or has access to an asset model 310 and a configuration database 312. The asset model 310 stores information defining assets and their relationships with other assets (such as in a parent-child format or other multi-level format). An asset represents any hardware, software, or other physical or virtual component within a process control and automation system or an underlying industrial process being controlled. The assets identified in the asset model 310 could be associated with a single industrial site (or a portion thereof), multiple industrial sites (or portions thereof), or an entire enterprise. The assets identified in the asset model 310 include one or more model-based controllers 106. For each model-based controller 106, the asset model 310 can define the controller 106 as an asset and associate it as a child of a process unit asset or other equipment for which the controller 106 is built. Metadata for each controller 106, such as its vendor, version, and application type, can be stored in the asset model 310 for that controller 106. Metadata for each controller 106 could also include the inputs and outputs for that controller 106 and can be stored in the asset model 310.

The asset model 310 can also store information defining different scopes of responsibility and how those scopes are mapped to different assets or different levels of assets within the asset model 310. Different user roles can be assigned to the scopes of responsibility, and specific users can be assigned to specific user roles. In this way, the asset model 310 can be used to define specific scopes of responsibility for users and the assets associated with those users. This allows consistent scopes of responsibility to be achieved across a plant or enterprise.

The configuration database 312 stores information defining how data associated with one or more model-based controllers 106 will be analyzed. For example, the configuration database 312 could identify the frequency at which analytics algorithms should be executed for one or more model-based controllers 106. As a particular example, the configuration database 312 could store an execution plan for an individual model-based controller 106, a group of model-based controllers 106, or all model-based controllers 106. Any number of execution plans could be supported in the configuration database 312. Each execution plan and its associated controller asset and controller metadata could be published to other components of the server node 304 to support analysis of controller data for the associated controller 106.

The server node 304 further includes or has access to various analysis algorithm images 314. The analysis algorithm images 314 represent data analysis routines that could be used to analyze data from a model-based controller 106 in order to identify possible operational issues with the controller 106. The analysis algorithm images 314 could be defined in any suitable manner, such as by a provider of an analysis software package executed by the server node 304 or by engineers or other personnel associated with a process control and automation system. Each analysis algorithm image 314 could support any suitable computations or other operations used to process data associated with a model-based controller 106 and determine whether (and to what extent) the controller 106 is suffering from an operational problem.

A batch execution engine 316 instantiates various ones of the analysis algorithm images 314 into analysis containers 318 and then executes the analysis containers 318. For example, based on an execution plan contained in or published from the configuration database 312, the batch execution engine 316 can select one or more suitable analysis algorithm images 314 for a controller 106 (such as based on the controller's vendor, version, and application type) and instantiate one or more containers 318 for the selected image(s) 314. The batch execution engine 316 can then execute analytics routines contained in the containers 318 and output the results, such as to a historian 320 or other database for storage. In this way, the batch execution engine 316 uses the analysis algorithm images 314 and the analysis containers 318 to execute logic that analyzes controller-related data in order to identify any operational issues that might be affecting the controller 106 and the impacts of those operational issues. In some embodiments, the batch execution engine 316 can represent a set of services or other logic that instantiates and monitors jobs, providing elasticity and scalability by adding or removing jobs based on demand and availability of computing resources.

Each container 318 can package all algorithm dependencies for a particular analysis algorithm within itself. This allows each container 318 to be instantiated and executed in any suitable system, thereby enabling the framework 300 to be scalable and elastic. Based on a particular controller's vendor and version and the specific controller issue to be identified, an associated analytics algorithm can be instantiated from its image 314 and executed independently using a container 318. For automatic identification of specific controller issues, the framework 300 can provide generic container interface functions to input data to containers 318, execute analytics in the containers 318, and output results from the containers 318 (such as in a standard format) for each specific controller issue based on its schema. This helps to keep the framework 300 version- and vendor-neutral.

In addition, the server node 304 includes a workflow engine 322 and a security module 324. The workflow engine 322 generally operates to identify workflows or other actions that could be used to reduce or resolve the impacts of operational issues affecting the model-based controllers 106. The workflow engine 322 can also be used to trigger initiation or execution of selected workflows or other actions, such as based on user input once a user has viewed the analysis results generated by the batch execution engine 316. The results of the execution of the workflows or other actions (such as their disposition statuses) could be stored and maintained to support traceability and auditing.

The security module 324 can be used to support a secure data transfer mechanism between the server node 304 and other components (such as the controllers 106, historian 114, or client nodes 302). The secure data transfer mechanism helps to protect the data being collected by the server node 304, such as when the data is collected from remote sources over the Internet or other unsecure network. Any suitable secure data transfer technique could be supported by the security module 324. Note, however, that if the server node 304 resides within a control and automation system 100, there may be little or no need to use a secure data transfer mechanism to protect data being transferred to the server node 304.

The web server 308 in the framework 300 can be used to provide graphical user interfaces to users of the client nodes 302. The graphical user interfaces can be provided so that different users are able to understand and use the results of the analyses performed by the server node 304. For example, the graphical user interfaces can help users to identify how units or other equipment at an industrial site are being driven by various process models used by their controllers 106 and the associated economic or other costs. The graphical user interfaces can also help users to identify which instruments or models need maintenance and which equipment needs cleaning or regeneration. The graphical user interfaces can further help users to identify which operators need training or which process variable targets are unachievable or overly conservative. The framework 300 can also provide contextual visualizations and prioritized recommendations to the users in the graphical user interfaces, such as based on their scopes of responsibility and user roles, in order to improve the implementation of optimal conditions.

In some embodiments, analysis results can be presented in different graphical user interfaces based on the roles of the users using the graphical user interfaces. For example, an operations management view in a graphical user interface could allow an operations manager to understand the impacts of operator behaviors, equipment issues, and other external factors on a model-based controller 106 and consequently the impacts of those factors on performance of the industrial process and the health of equipment in the industrial process. Specific visualizations (such as tree maps) can show weighted economic or other benefits or costs and drilldown in the asset hierarchy defined by the asset model 310. A process engineer's view in a graphical user interface could highlight the impacts of key constraint limits on the performance of the industrial process. A control engineer's view in a graphical user interface could provide detailed diagnostic insights into underlying causes of good or poor controller performance, possibly along with an assessment of the economic or other impacts of the underlying issues to help justify corrective actions (such as process or application maintenance or operator training). Specific controller issues related to particular entities in the asset model 310 can be listed priority-wise, along with their economic or other impacts, to focus on actions that realize the most benefits. Rolled-up economic or other benefits per shift can be shown to check if any operator needs mentoring on controller aspects.

The framework 300 shown in FIG. 3 is therefore able to perform various functions in a cohesive process to provide intuitive progression from surfacing a controller issue to its resolution. These functions include automatic identification of controller issues, contextual visualization of the controller issues, and resolution of the controller issues. The automatic identification of controller issues is supported by the batch execution engine 316, which instantiates the analysis algorithm image(s) 314 appropriate for a specific controller 106 into one or more containers 318 for execution. Controller issues discovered using the executed analytics can be prioritized, such as based on weighted economic or other benefits or impacts. In some cases, the controller issues can be ranked with the issues having the maximum impacts listed first. In some embodiments, economic or other benefits or impacts estimated using the executed analytics can be aggregated and rolled-up to higher-level entities in the asset model 310 (such as to those levels that make sense to operations leaders, unit managers, and process engineers). The amount of roll-up and aggregation can be based on different user roles.

The contextual visualization of controller issues is supported by the generation of different graphical user interfaces for presentation to different users (such as operations leaders, unit managers, and process engineers). The visualizations can include graphical representations of controller issues and related auto-suggested actions that are based on selected entities in the asset model 310, the users' roles, and the users' scopes of responsibility. One example goal for the use of the contextual visualizations could be to provide a good line of sight between the issues that impact a model-based controller's performance and how to resolve those issues. Another example goal could be to reduce the difficulty and cost of maintaining and improving the performance of the industrial process and the model-based controller(s) 106 in the control and automation system. In specific embodiments, this approach can help to improve collaboration between the operations management, process engineering, and control engineering personnel in order to maintain and improve the performance of the industrial process while leveraging the model-based controller(s) 106 to achieve the best effect. Note, however, that the approaches described in this patent document could be used in any other suitable manner.

The resolution of controller issues is supported by providing prioritized recommendations based on weighted benefits or impacts to the users so that the users can take or initiate actions, possibly through the graphical user interfaces. Example recommendations for controller issues could include changes to process variable limits and/or controller tuning parameters, mentoring operators on controller behaviors, model changes, re-calibration of soft sensors, and repairing malfunctioning instrumentation. The graphical user interfaces can provide users with the ability to trigger workflows or initiate auto-suggested actions. As an example, suppose a controller issue has an auto-suggestion to change a particular model. The framework 300 can offer an option to a user for initiating a stepper application or other application to identify a new model for the controller 106. If the recommendation is to repair malfunctioning instrumentation, the framework 300 can offer an option to a user for initiating a work order to repair the equipment. Comments and action disposition statuses can be recorded to maintain traceability and to audit the resolution of controller issues.

Note that the framework 300 shown in FIG. 3 is implemented using a client-server architecture, which itself could be implemented in various ways. For example, one or more client nodes 302 and one or more server nodes 304 could be implemented "on premises," meaning completely within a single industrial site or within an enterprise's overall system. Alternatively, one or more client nodes 302 could reside within a process control and automation system 100, while one or more server nodes 304 reside "in the cloud" or at some remote location(s) and provide the described functionality as a service. Of course, other architectures could also be used, such as when the functionality of the server node 304 is installed completely on each user's computing device. There could also be a single instance or multiple instances of the framework 300 used for a single industrial site or multiple industrial sites, and each instance of the framework 300 could be used by a single enterprise or multiple enterprises.

Also note that each component of the server node 304 in FIG. 3 could be implemented in any suitable manner. For example, the asset model 310, configuration database 312, analysis algorithm images 314, and analysis containers 318 could be stored in the storage device(s) 204 of the device 200 using any suitable data structures. Also, each of the web server 308, batch execution engine 316, workflow engine 322, and security module 324 could be implemented using software/firmware instructions that are executed by the processor(2) of the device 200. In addition, the historian 320 could represent any suitable information storage and retrieval device within or outside of the device 200, such as the storage device(s) 204 or an external database (like the historian 114).

Although FIG. 3 illustrates one example of a framework 300 for identifying, visualizing, and triggering workflows from auto-suggested actions to reclaim lost benefits of model-based industrial process controllers, various changes may be made to FIG. 3. For example, the functional divisions shown in FIG. 3 are for illustration only. Various data elements could be combined, further subdivided, or omitted and additional data elements could be added according to particular needs. Also, various functional elements could be combined, further subdivided, or omitted and additional functional elements could be added according to particular needs.

Figure 4A:
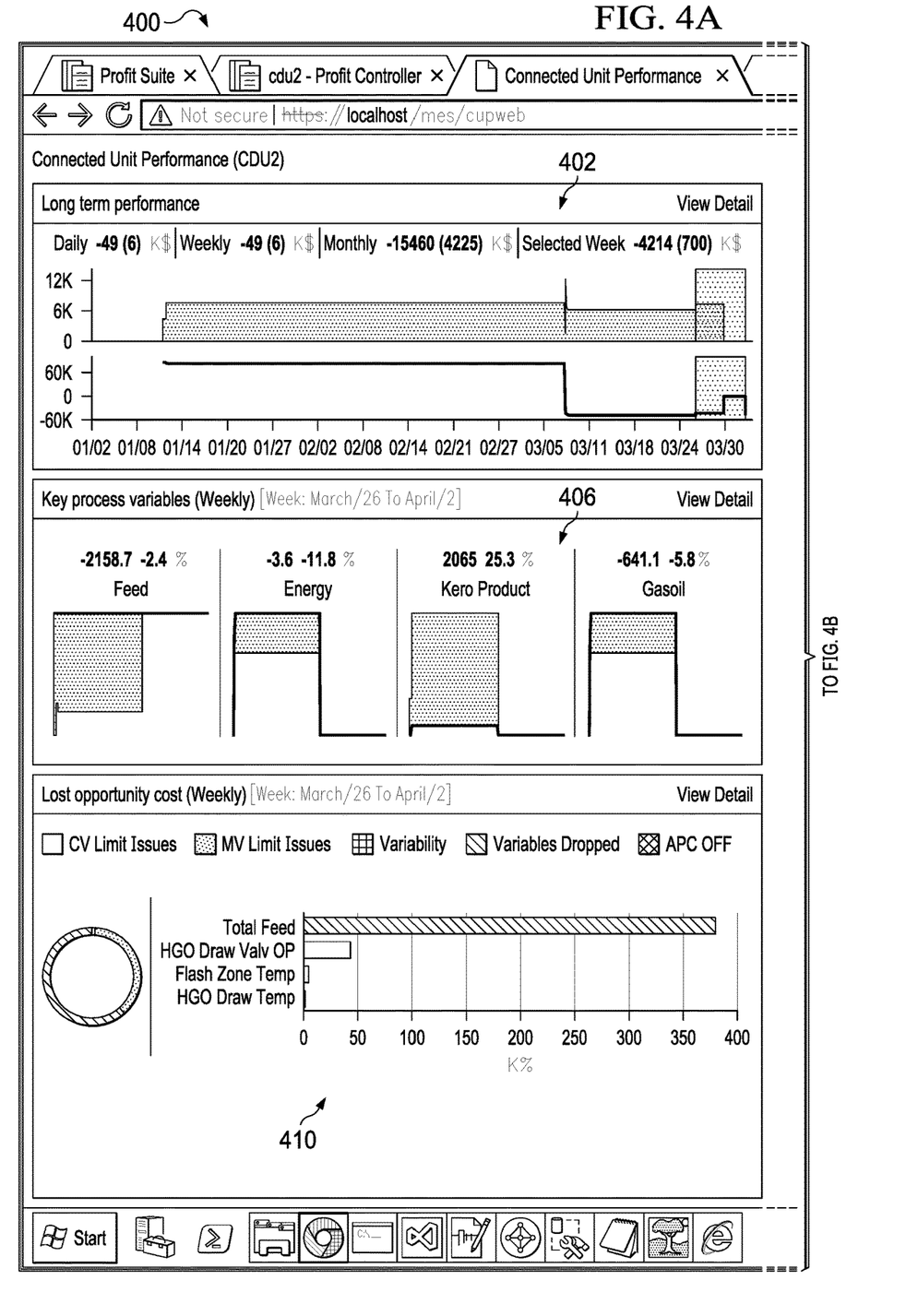
FIGS. 4A and 4B illustrate an example graphical user interface for visualizing and triggering workflows from auto-suggested actions to reclaim lost benefits of model-based industrial process controllers according to this disclosure.
Figure 4B:
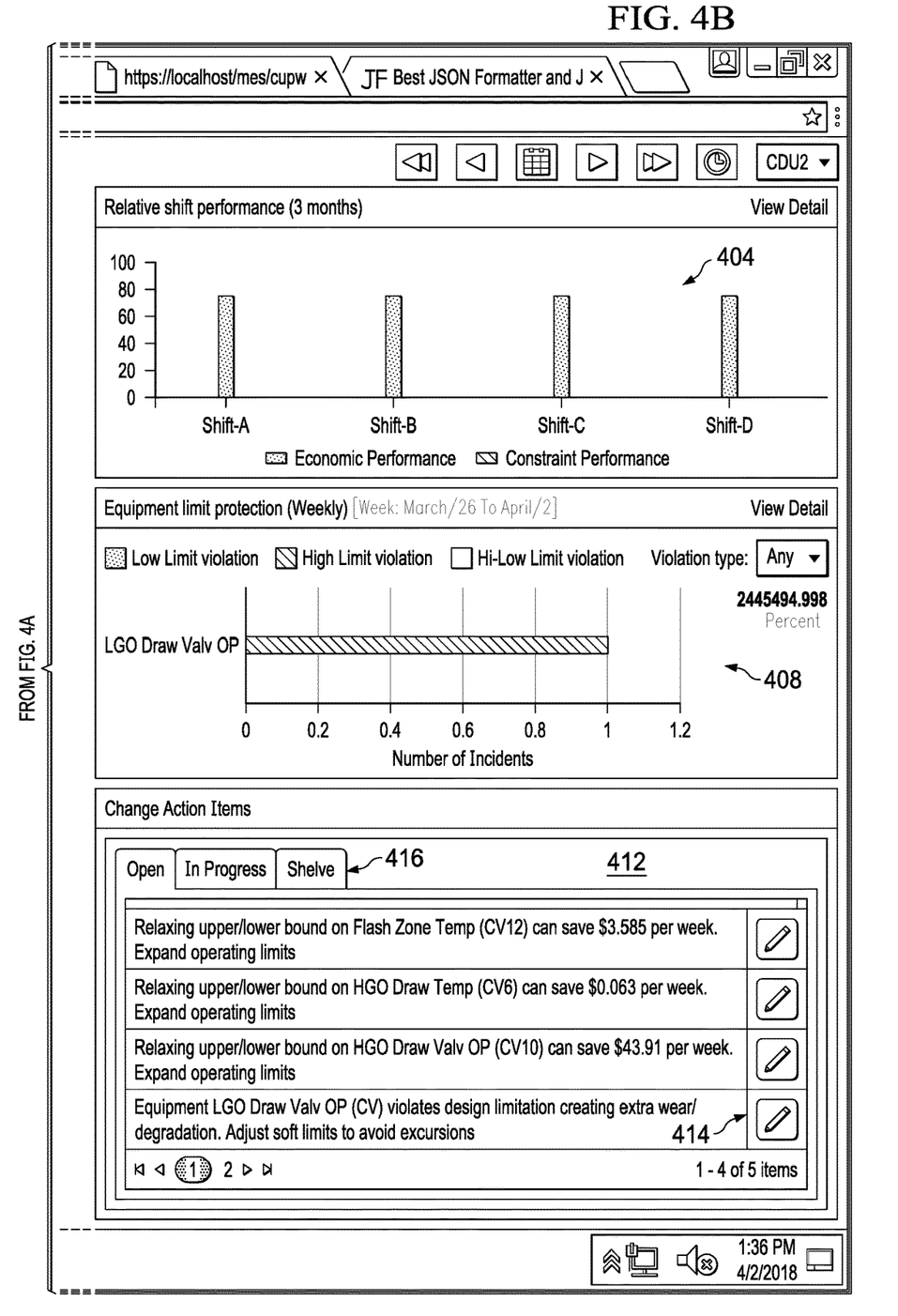

FIGS. 4A and 4B illustrate an example graphical user interface 400 for visualizing and triggering workflows from auto-suggested actions to reclaim lost benefits of model-based industrial process controllers according to this disclosure. The graphical user interface 400 could, for example, be generated by the server node 304 and be presented to at least one user who is using at least one client device 302. For ease of explanation, the graphical user interface 400 is described as being generated by the device 200 of FIG. 2 implementing an operator console 110, server 116, or device used in the computing cloud 118 of FIG. 1. However, the graphical user interface 400 could be generated by any suitable device and in any suitable system.

As shown in FIGS. 4A and 4B, the graphical user interface 400 includes various information about specific equipment that implements at least part of an industrial process. This specific equipment could be selected in any suitable manner, such as by using a tree identifying a hierarchy of equipment that can be navigated by a user or by using another display that identifies or includes at least the specific equipment.

For the specific selected equipment, the graphical user interface 400 includes a section 402 identifying the long-term performance of the equipment and a section 404 identifying how the equipment operates during different work shifts (which are associated with different human operators). The graphical user interface 400 also includes a section 406 identifying the behaviors of key process variables associated with the selected equipment and a section 408 identifying limit violations (if any) for the selected equipment. This information could be generated in any suitable manner, such as when the limit violations are identified using the techniques disclosed in U.S. patent application Ser. No. 15/972,432 entitled "APPARATUS AND METHOD FOR AUTOMATED IDENTIFICATION AND DIAGNOSIS OF CONSTRAINT VIOLATIONS".

The graphical user interface 400 further includes a section 410 that identifies how operational issues affect the performance of at least one model-based controller associated with the selected equipment. In this example, the section 410 identifies different contributory causes (operational issues) that result in reduced controller performance and how each of those causes contributes to lost opportunity costs (expressed in terms of a lost opportunity cost). The lost opportunity costs identify improvements that could be made to the operation of a model-based controller 106.

A section 412 identifies one or more possible corrective courses of action that could be taken to reduce or resolve one or more of the operational issues identified in section 410. The possible corrective courses of action could be identified in any suitable manner, such as based on information in a knowledge repository or based on operation of the workflow engine 322. In some embodiments, the section 412 also allows each corrective course of action to be triggered by a user. For instance, the possible corrective courses of action identified in section 412 could be displayed as hyperlinks, which can be selected by the user in order to initiate a workflow or other action used to implement the selected course of action. Buttons 414 could also be displayed for the corrective courses of action and can be used by the user to enter notes, trigger or close the courses of action, or perform other functions. Tabs 416 allow the user to view open courses of action, courses of action that are currently being performed, and shelved or closed courses of action.

Although FIGS. 4A and 4B illustrate one example of a graphical user interface 400 for visualizing and triggering workflows from auto-suggested actions to reclaim lost benefits of model-based industrial process controllers, various changes may be made to FIGS. 4A and 4B. For example, the content and layout of the graphical user interface 400 could vary as needed or desired. As a particular example, the graphical user interface 400 could vary based on the user role of the user who is to view the graphical user interface 400.

Figure 5:
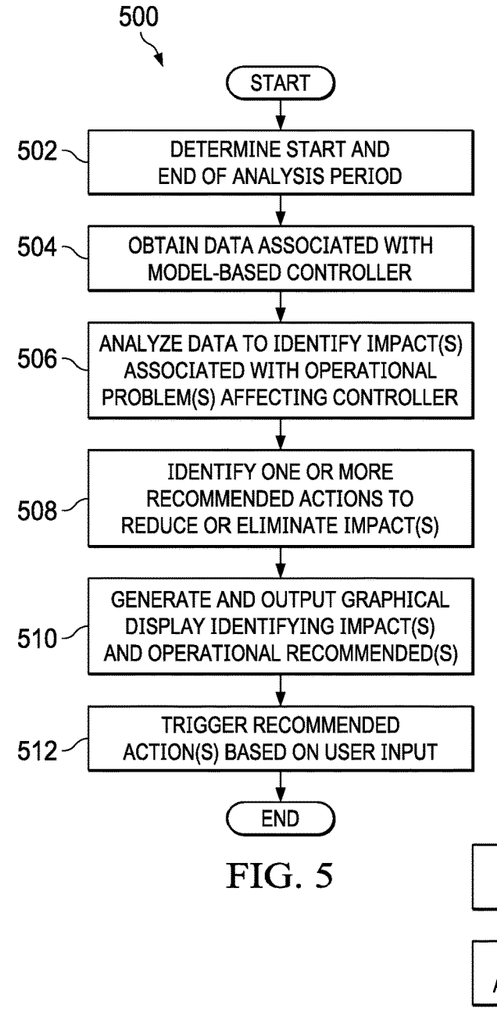
FIG. 5 illustrates an example method for identifying, visualizing, and triggering workflows from auto-suggested actions to reclaim lost benefits of model-based industrial process controllers according to this disclosure.

FIG. 5 illustrates an example method 500 for identifying, visualizing, and triggering workflows from auto-suggested actions to reclaim lost benefits of model-based industrial process controllers according to this disclosure. For ease of explanation, the method 500 is described as being performed by the device 200 of FIG. 2 implementing an operator console 110, server 116, or device used in the computing cloud 118 of FIG. 1. However, the method 500 could be used with any suitable device and in any suitable system.

As shown in FIG. 5, a start and an end of an analysis period are identified at step 502. This could include, for example, the processor 202 of the device 200 determining the period during which data associated with a model-based controller 106 will be analyzed. Any suitable period of time could be identified here, such as a particular day, week, month, or other period of time. In some embodiments, the analysis period for a controller 106 can be defined based on the published execution plan contained in the configuration database 312 for that controller 106.

Data associated with the model-based controller is obtained at step 504. This could include, for example, the processor 202 of the device 200 obtaining data identifying values of process variables used by the controller 106 and other data associated with the controller 106. This could also include the processor 202 of the device 200 pre-processing the data, such as to validate the obtained data and discard any portions of the obtained data deemed invalid. Note that when the data is obtained by a device that is remote from the controller 106 or other data source, the data can be transmitted to the device securely and in real-time, near real-time, or non-real-time depending on the embodiment.

The data is analyzed to identify at least one impact associated with one or more operational problems affecting the controller at step 506. This could include, for example, the processor 202 of the device 200 executing the batch execution engine 316 to analyze the data and determine whether the controller 106 is suffering from issues that prevent the controller 106 from achieving its maximum potential benefits. Example techniques for identifying possible impacts associated with one or more operational problems affecting a model-based controller are described in the various provisional patent applications incorporated by reference above, as well as in U.S. patent application Ser. No. 15/972,534 entitled "APPARATUS AND METHOD FOR ESTIMATING IMPACTS OF OPERATIONAL PROBLEMS IN ADVANCED CONTROL OPERATIONS FOR INDUSTRIAL CONTROL SYSTEMS". As noted above, the impacts could be expressed in any suitable terms, such as excess material usage, excess energy usage, reduced product production, or economic costs (and economic costs could themselves be a measure of things like excess material usage, excess energy usage, or reduced product production).

One or more recommended actions for reducing or eliminating at least one of the impacts are identified at step 508. This could include, for example, the processor 202 of the device 200 executing the workflow engine 322 to identify possible corrective actions that could be used to reduce the impacts of the identified operational issues. Any suitable recommended actions could be identified here, and the recommended action(s) identified for a particular impact can be based on the specific operational issue causing the impact. For example, changes to process variable limits and/or controller tuning parameters could be recommended when an operational issue relates to over-constrained process variables or improperly configured controllers. Mentoring operators on controller behaviors could be recommended when an operational issue relates to process variables being placed into improper modes or being dropped from consideration by a controller 106. Model changes could be recommended when an operational issue relates to the quality of one or more models used by a controller 106. Re-calibration of soft sensors could be recommended when an operational issue relates to the quality of one or more inferred properties used by a controller 106. Repairing malfunctioning instrumentation could be recommended when an operational issue relates to invalid data being received.

A graphical display identifying at least one of the impacts and at least one of the recommended actions is generated and presented to one or more users at step 510. This could include, for example, the processor 202 of the device 200 generating a graphical user interface that identifies one or more of the impacts and one or more of the recommended actions in a control-relevant context. The impacts could be ranked, such as in order of decreasing costs or other impacts or in order of increasing benefits that could be obtained. The recommended actions could also be ranked, such as based on the associated impacts. In some embodiments, the analysis results may be intended for different types of personnel, such as process managers, engineers, or other personnel. As a result, the analysis results in a graphical display could be expressed in appropriate terms for each type of user, such as based on each user's user role or scope of responsibility. The analysis results could also be presented based on a specific asset or assets selected in the asset model 310 for which the data is being analyzed.

One or more recommended actions are triggered based on user input at step 512. This could include, for example, the processor 202 of the device 200 receiving user input indicating that at least one of the recommended actions presented in the graphical display should be initiated or otherwise performed. This could also include the workflow engine 322 initiating the recommended action(s) and tracking the status of each triggered action. An action could be performed in any suitable manner, such as by the device 200 or by personnel who respond to workflow requests or requests issued by the device 200 or another system.

Although FIG. 5 illustrates one example of a method 500 for identifying, visualizing, and triggering workflows from auto-suggested actions to reclaim lost benefits of model-based industrial process controllers, various changes may be made to FIG. 5. For example, while shown as a series of steps, various steps in FIG. 5 could overlap, occur in parallel, occur in a different order, or occur any number of times.

Figure 6:
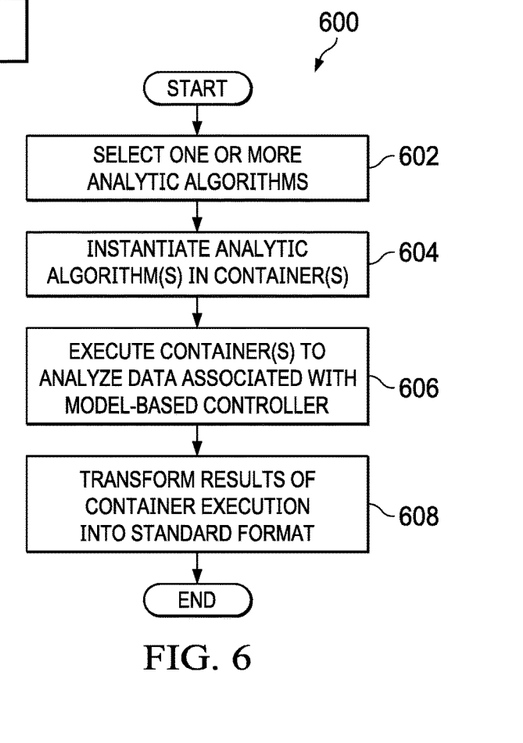
FIG. 6 illustrates an example method for analyzing data to identify suggested actions to reclaim lost benefits of model-based industrial process controllers according to this disclosure.

FIG. 6 illustrates an example method 600 for analyzing data to identify suggested actions to reclaim lost benefits of model-based industrial process controllers according to this disclosure. The method 600 could, for example, be performed during step 506 in the method of FIG. 5. For ease of explanation, the method 600 is described as being performed by the device 200 of FIG. 2 implementing an operator console 110, server 116, or device used in the computing cloud 118 of FIG. 1. However, the method 600 could be used with any suitable device and in any suitable system.

As shown in FIG. 6, one or more analytic algorithms are selected for analyzing data associated with a model-based controller at step 602. This could include, for example, the processor 202 of the device 200 executing the batch execution engine 316 to identify metadata associated with a controller 106, such as its vendor, version, and operational problem to be detected. This could also include the processor 202 of the device 200 executing the batch execution engine 316 to select one or more analysis algorithm images 314 based on the metadata. The one or more selected analytic algorithms are instantiated into one or more containers at step 604. This could include, for example, the processor 202 of the device 200 executing the batch execution engine 316 to generate an executable container 318 for each selected analysis algorithm image 314.

The one or more containers are executed to analyze the data associated with the controller at step 606. This could include, for example, the processor 202 of the device 200 executing the batch execution engine 316 to analyze the data associated with the controller 106 using the logic contained in the one or more containers 318. The logic in the container(s) 318 is used to analyze the data and identify possible operational issues affecting the controller 106. The logic in the container(s) is also used to estimate the impact or impacts associated with each of the identified operational issues.

The results of the execution are transformed into a standard format at step 608. This could include, for example, the processor 202 of the device 200 executing the batch execution engine 316 to translate any identified operational issues into a standard form, such as a description of the operational issue and any likely causes of the operational issue. This could also include the processor 202 of the device 200 executing the batch execution engine 316 to translate any identified impacts into a standard form, such as a description of the impact and an associated measure of the impact (like in terms of a cost or lost benefit). Note that the standard format used here does not require the use of a format that is approved by a standards body. Rather, the standard format can denote any suitable format that is standardized across different operational issues and impacts, even if the standard format is proprietary.

Although FIG. 6 illustrates one example of a method 600 for analyzing data to identify suggested actions to reclaim lost benefits of model-based industrial process controllers, various changes may be made to FIG. 6. For example, while shown as a series of steps, various steps in FIG. 6 could overlap, occur in parallel, occur in a different order, or occur any number of times. Also, the use of containers is optional, and analytic algorithms can be executed in any other suitable manner. In addition, the transformation of analysis results may not be required, such as when the analytic algorithms are themselves configured to generate analysis results in a desired format.

Note that the techniques for identifying, visualizing, and triggering workflows from auto-suggested actions to reclaim lost benefits of model-based controllers described above could be used or operate in conjunction with any combination or all of various features described in the provisional patent applications incorporated by reference above and/or in the following patent applications (all of which are hereby incorporated by reference):

U.S. patent application Ser. No. 15/972,432 entitled "APPARATUS AND METHOD FOR AUTOMATED IDENTIFICATION AND DIAGNOSIS OF CONSTRAINT VIOLATIONS";

U.S. patent application Ser. No. 15/973,272 entitled "APPARATUS AND METHOD FOR IDENTIFYING IMPACTS AND CAUSES OF VARIABILITY OR CONTROL GIVEAWAY ON MODEL-BASED CONTROLLER PERFORMANCE"; and U.S. patent application Ser. No. 15/972,534 entitled "APPARATUS AND METHOD FOR ESTIMATING IMPACTS OF OPERATIONAL PROBLEMS IN ADVANCED CONTROL OPERATIONS FOR INDUSTRIAL CONTROL SYSTEMS".

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for managing over time an effectiveness of a model-based process controller in controlling an industrial process in accordance with one or more operating targets, the model-based process controller including one or more models to model at least part of the industrial process, the method comprising:
   receiving operational data from one or more components associated with the operation of the industrial process;
   processing the received operational data, the processing of the received operation data identifying a loss of effectiveness over time of the model-based process controller in controlling the industrial process;
   identifying one or more causes of the identified loss of effectiveness of the model-based process controller;
   identifying one or more impacts of the loss of effectiveness of the model-based process controller in controlling the industrial process;
   quantifying the one or more impacts to rank the one or more impacts on a graphical display;
   generating one or more recommended actions to reduce or eliminate at least one of the one or more causes of the loss of effectiveness of the model-based process controller; and
   triggering at least one of the one or more recommended actions to reclaim at least some of the identified lost effectiveness of the model-based process controller in controlling the industrial process.

2. The method of claim 1, further comprises displaying one or more of the recommended actions on the graphical display for a user, wherein the one or more recommended actions are ranked based on the one or more impacts, and wherein the graphical display for the user is generated based at least one of: a user role for the user, a scope of responsibility for the user, and an asset selected in an asset model.

3. The method of claim 1, further comprising identifying at least one of: an estimated excess material usage of the industrial process, an estimated excess energy usage of the industrial process, and an estimated reduction in production of the industrial process resulting from the identified loss of effectiveness of the model-based process controller in controlling the industrial process as one of the one or more quantified impacts.

4. The method of claim 1, further comprising identifying at least one of: a model mismatch where a model of the model-based process controller no longer matches the industrial process, an operator behavior, a miss-calibrated sensor, and one or more misconfigurations of the model-based process controller as one of the one or more causes of the identified loss of effectiveness of the model-based process controller.

5. The method of claim 1, further comprising identifying a root cause of the identified loss of effectiveness of the model-based process controller.

6. The method of claim 1, further comprising:
   analyzing an effect on one or more controlled variables (CV) of the industrial process in response to at least one change to one or more manipulated variables (MV) manipulated by at least one of: the model-based process controller and one or more disturbance variables (DV).

7. The method of claim 1, further comprising displaying on the graphical display at least one of:
   a long-term performance of an equipment, an operation of the equipment during a plurality of work shifts, at least one key process variable associated with the equipment, a violation in a limit associated with the equipment, the one or more impacts on a performance of model-based process controller associated with the equipment, the one or more causes of the loss of effectiveness of the model-based process controller, and at least one button that allows a user to trigger at least one of the one or more recommended actions.

8. The method of claim 1, further comprising:
   ranking the one or more causes of the loss of effectiveness of the model-based process controller.

9. A non-transitory computer readable medium containing instructions that when executed cause at least one processing device to:
   receive operational data from one or more components of an industrial process;

process the received operational data, the processing identifying over time a loss of effectiveness of a model-based process controller in controlling the industrial process;

identify one or more causes of the identified loss of effectiveness of the model-based process controller;

identify and quantify one or more impacts of the loss of effectiveness of the model-based process controller in controlling the industrial process, and to rank the quantified one or more impacts on a graphical display;

generate one or more recommended actions to reduce or eliminate at least one of the one or more causes of the loss of effectiveness of the model-based process controller; and trigger at least one of the one or more recommended actions.

10. The non-transitory computer readable medium of claim 9, wherein the at least one processing device is configured to trigger at least one of the one or more recommended actions based at least in part on a user input received from a user.

11. The non-transitory computer readable medium of claim 9, wherein the at least one processing device is configured to analyze an effect on one or more controlled variables (CV) of the industrial process in response to at least one change to one or more manipulated variables (MV) manipulated by at least one of: the model-based process controller and one or more disturbance variables (DV).

12. The non-transitory computer readable medium of claim 9, wherein the graphical display is configured to display at least one of:

a long-term performance of an equipment, an operation of the equipment during a plurality of work shifts, at least one key process variable associated with the equipment, a violation in a limit associated with the equipment, the one or more impacts on a performance of the model-based process controller associated with the equipment, the one or more causes of the identified loss of effectiveness of the model-based process controller, the one or more recommended actions to resolve one or more causes of the identified loss of effectiveness of the model-based process controller, and at least one button that allows a user to trigger at least one of the one or more recommended actions.

13. The non-transitory computer readable medium of claim 12, wherein the graphical display is generated based on at least one of: a user role for the user, a scope of responsibility for the user, and an asset selected in an asset model.

14. The non-transitory computer readable medium of claim 9, wherein the at least one processing device is configured to:

identify at least one of: an estimated excess material usage of the industrial process, an estimated excess energy usage of the industrial process, and an estimated reduction in production of the industrial process resulting from the identified loss of effectiveness of the model-based process controller in controlling the industrial process as one of the quantified one or more impacts.

15. The non-transitory computer readable medium of claim 9, wherein the at least one processing device is configured to:

identify at least one of: a model mismatch where a model of the model-based process controller no longer matches the industrial process, an operator behavior, a miss-calibrated sensor, and one or more misconfigurations of the model-based process controller as one of the one or more causes of the loss of effectiveness of the model-based process controller.

16. The non-transitory computer readable medium of claim 9, wherein the at least one processing device is configured to:

identify a root cause of the loss of effectiveness of the model-based process controller.

17. An apparatus comprising:

at least one interface configured to receive operational data regarding an industrial process; and at least one processor configured to:

identify a loss of effectiveness over time of a model-based process controller in controlling the industrial process;

identify one or more causes of the identified loss of effectiveness of the model-based process controller;

identify and quantify one or more impacts of the loss of effectiveness of the model-based process controller in controlling the industrial process, and to rank the quantified one or more impacts on a graphical display;

generate one or more recommended actions to reduce or eliminate at least one of the one or more causes of the loss of effectiveness of the model-based process controller; and trigger at least one of the one or more recommended actions to reclaim at least some of the lost effectiveness of the model-based process controller in controlling the industrial process.

18. The apparatus of claim 17, wherein the at least one processor is further configured to analyze an effect on one or more controlled variables (CV) of the industrial process in response to at least one change to one or more manipulated variables (MV) manipulated by at least one of: the model-based process controller and one or more disturbance variables (DV).

19. The apparatus of claim 17, wherein the graphical display is configured to display at least one of:

a long-term performance of an equipment, an operation of the equipment during a plurality of work shifts, at least one key process variable associated with the equipment, a violation in a limit associated with the equipment, the one or more impacts on a performance of model-based process controller associated with the equipment, the one or more causes of the identified loss of effectiveness of the model-based process controller, the one or more recommended actions to resolve the identified loss of effectiveness of the model-based process controller, and at least one button that allows a user to trigger at least one of the one or more recommended actions.

20. The apparatus of claim 19, wherein the graphical display is generated based on at least one of: a user role for the user, a scope of responsibility for the user, and an asset selected in an asset model.

* * * * *